US009327993B2

(12) United States Patent
Chaput et al.

(10) Patent No.: US 9,327,993 B2
(45) Date of Patent: May 3, 2016

(54) METHOD FOR PREPARING RARE EARTH FLUORIDE NANOPARTICLES

(75) Inventors: Frédéric Chaput, Villeurbanne (FR); Cédric Desroches, Lyons (FR); Stéphane Parola, Jonage (FR)

(73) Assignees: UNIVERSITE CLAUDE BERNARD LYON I, Villeurbanne (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 1088 days.

(21) Appl. No.: 13/378,429

(22) PCT Filed: Jun. 21, 2010

(86) PCT No.: PCT/FR2010/051254
§ 371 (c)(1),
(2), (4) Date: Mar. 9, 2012

(87) PCT Pub. No.: WO2010/149918
PCT Pub. Date: Dec. 29, 2010

(65) Prior Publication Data
US 2012/0164049 A1    Jun. 28, 2012

(30) Foreign Application Priority Data
Jun. 23, 2009 (FR) .................... 09 54263

(51) Int. Cl.
| | |
|---|---|
| *C01F 17/00* | (2006.01) |
| *B01J 13/00* | (2006.01) |
| *B82Y 30/00* | (2011.01) |
| *C01B 31/00* | (2006.01) |

(52) U.S. Cl.
CPC .......... *C01F 17/0062* (2013.01); *B01J 13/0091* (2013.01); *B82Y 30/00* (2013.01); *C01B 31/00* (2013.01); *C01P 2002/72* (2013.01); *C01P 2004/04* (2013.01); *C01P 2004/16* (2013.01); *C01P 2004/32* (2013.01); *C01P 2004/52* (2013.01); *C01P 2004/62* (2013.01); *C01P 2004/64* (2013.01)

(58) Field of Classification Search
USPC .................................... 423/263, 489
See application file for complete search history.

(56) References Cited

U.S. PATENT DOCUMENTS 6,281,151 B1 * 8/2001 Tick ..................... 501/3
2009/0302195 A1 * 12/2009 Muenchausen et al. ...... 250/200

FOREIGN PATENT DOCUMENTS

JP       01-028203       1/1989

OTHER PUBLICATIONS

Fujihara S. et al., "Formation of LaF3 Microcrystals in sol-gel Silica", Journal of Non-Chrystalline Solids, North-Holland Physics Publishing. Amsterdam, NL. vol. 244, No. 2-3, Mar. 2, 1999, pp. 267-274, XP004166727.

(Continued)

*Primary Examiner* — Ngoc-Yen Nguyen
(74) *Attorney, Agent, or Firm* — Clark & Brody

(57) ABSTRACT

The present invention relates to a method for preparing nanoparticles at least partially consisting of rare earth fluoride, characterized in that said fluoride is produced, in a solution, from a salt of the corresponding rare earth element and from a charge-transfer complex of formula (I), where Ra, Rb, and Rc are as defined in claim 1.

15 Claims, 6 Drawing Sheets

(56) References Cited

OTHER PUBLICATIONS

Fujihara S. et al., "Influence of solution . . . sol-gel process", Jounral of Materials Science, vol. 35, No. 11, 2000, pp. 2763-2767, XP2573381.

Combelas P. et al., "Protonation du N, . . . vibrationelle et electronique", Canadian Journal of Chemistry, vol. 53, 1975, pp. 442-447, XP002573487.

Eiden-Assmann S. et al., "CeF3 nanoparticles: synthesis and characterization" Materials Research Bulletin, Elsevier, Kidlington, GB, vol. 39, No. 1, Jan. 3, 2004, pp. 24-244, XP004480288.

Dimaio J.R. et al., "Structural determination . . . core/shell architectures", Advanced Materials 20071019 Wiley-VCH Verlag, DE, vol. 18, No. 20, Oct. 19, 2007, pp. 3266-3270, XP002573382.

Marina M. Lezhnina et al., "Efficient Luminescence . . . Functional Shells", Adv. Funct. Mat. 2006, 16, 935-942.

Jean-Luc Lemyre et al., "Synthesis of . . . Shape and Size", Chem. Mater. 2005, 17, 3040-3043.

Yan et al., "From Trifluoroacetate . . . Solution Phase", Chem. Eur. J. 2007, 13, 2320-2332.

Jan W. Stouwdam et al., "Near-infrared . . . Nanoparticles", Nano Letters, 2002, vol. 2. No. 7, 733-737.

Jeffrey R. DiMaio et al., "Structural Determination . . . Core/Shell Architectures", Adv. Mater. 2007, 19, 3266-3270.

Shinobu Fujihara et al., "Formation of . . . sol-gel silica", Journal of Non-Crystalline Solids 244, 1999, 267-274.

S. Fujihara et al., "Influence of . . . sol-gel process", Journal of Materials Science, 35, 2000, 2763-2767.

P. Combelas et al., "Protonation du . . . et electronique" Can J. Chem. 53, 442 (1975).

Zhen et al., "One-Step . . . any ligands", Nanotechnology, 2007, vol. 18, No. 46, pp. 465606.1-465606.6.

\* cited by examiner

METHOD FOR PREPARING RARE EARTH FLUORIDE NANOPARTICLES

The present invention relates to the technical field of the preparation of rare earth fluorides, in particular in the form of nanoparticles.

Rare earth fluorides have numerous applications, especially in the medical field, for example X-ray therapy for the treatment of cancer or in cellular imaging, by MRI or fluorescence. Such compounds are also interesting in optics or in luminescence, in particular for the production of scintillators, field emitters or nanophosphorescent compounds. Optoelectronics and pigments are other fields of application. In the applications cited, the rare earth fluorides are generally used in the form of nanoparticles. Conventional methods for preparing nanoparticles of rare earth fluoride are most often difficult to implement and pose difficulties in terms of implementation on an industrial scale.

As an example of known methods include:
the method described in Lezhnina et al, Adv. Func. Mat., 2006, Vol. 16, No. 7, pp. 935-942, which implements a reaction under pressure and hot conditions (180° C. in an autoclave) between $Ln(NO_3)_3$ and $NH_4F$,
the microemulsion method described, for example, in the publication M. Ritcey et al., Chem. Mater., 2005, Vol. 17, pp. 3040-3043, which requires the handling of large amounts of solvent and the purification of which may be complicated by the presence of the surfactants used,
the decomposition of rare earth metal trifluoroacetates under argon under hot conditions (300° C.) described by Yan et al, Chem. Eur. J., 2007, Vol. 13, No. 8, pp. 2320-2332, which, in addition to the fact of requiring hard synthetic conditions, is limited to the preparation of nanoparticles exhibiting a hydrophobic nature,
the reaction of lanthanide salts with sodium fluoride in aqueous solution in the presence of dioctadecyl dithiophosphate (TDP), such as described by Van Veggel et al., Nanoletter 2002, Vol. 2, No. 7, pp. 733-737, or Ballato et al., Adv. Mater., 2007, Vol. 19, pp. 3266-3270, which results in simple fluoride nanoparticles, of trigonal structure, the surface of which is rendered hydrophobic by the dithiophosphate. The use of toxic TDP may be problematic.
the method employing the rare earth trichloride and $NH_4F$ in methanol, described by Zhen et al., Nanotechnology, 2007, Vol. 18, No. 46, pp. 465606.1-465606.6, which, in the case of simple fluorides, is limited to those exhibiting a trigonal structure.

These different processes lead either to compounds with unsatisfactory purity or nanoobjects with low crystallinity. In addition, some of these processes use restrictive conditions of temperature and pressure and/or are adapted to a limited number of chemical compositions.

In the publication by Fujihara et al. in Journal of Non-Crystalline Solids, 1999, 244, 267-274, the authors describe the preparation of $LaF_3$ nanoparticles in a glass matrix prepared by sol-gel process. For this, two solutions are prepared. The first consists of a mixture of tetramethoxysilane (TMOS) and DMF (solution 1). The DMF is used here as agent for controlling the drying of the gel (in order to keep it monolithic) and not as reactant involved in the synthesis of the fluoride nanoparticles. The other solution (solution 2) is composed of lanthanum acetate, trifluoroacetic acid, nitric acid (in a catalytic amount) and water. In the latter solution, the anions associated with the acids react directly with the $La^{3+}$ ions in the absence of DMF, which is only present in solution 1. When mixing the above solutions, a charge transfer complex could be done with nitric acid (catalytic amount here) and DMF. The charge transfer complexes have been demonstrated only with mineral acids and not with organic acids. Even if, this is very unlikely, a charge transfer complex formed between DMF and trifluoroacetic acid, at any time of the process described in this document, it would form lanthanum fluoride nanoparticles in solution but only lanthanum trifluoroacetate, which would remain dissolved in the reaction mixture, without precipitation. Furthermore, the same authors have found that lanthanum trifluoroacetate is already formed in solution 2 without DMF (method II in Fujihara et Journal of Material Sciences, 2000, 25, 2763-2767). These publications do not offer the synthesis of nanoparticles of rare earth fluoride in solution. In both publications, the synthesis of $LaF_3$ nanoparticles occurs after drying the doped silica gel (obtained by hydrolysis/condensation of the TMOS in the presence of $La^{3+}$ and trifluoroacetic acid) and heat treatment at a temperature of greater than 300° C. of the doped silica xerogels. At this temperature, the trifluoroacetic acid decomposes releasing $F^-$ ions, which then combine with the $La^{3+}$ ions to form $LaF_3$ crystallites. These crystallites remain trapped in the glassy matrix. In no way do these documents describe a method for preparing nanoparticles of rare earth fluorides in solution.

In this context, the present invention intends to provide a novel process for the preparation of rare earth fluorides which is easy to implement and inexpensive. This process is targeted at the preparation of rare earth fluoride nanoparticles, indeed even of nanoparticles made of another material exhibiting a coating of rare earth fluorides.

The process according to the invention must also make it possible to control the chemical compositions obtained and to control the purity of the compounds prepared, and also the crystallinity.

In this context, the invention relates to a process for the preparation of nanoparticles composed, at least in part, of a rare earth fluoride, characterized in that said fluoride is obtained, in solution, from a salt of the corresponding rare earth metal and from a charge transfer complex of formula (I):

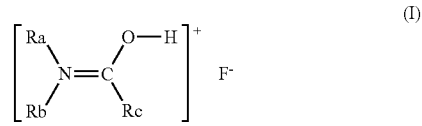

with:
Ra and Rb, which are identical or different, representing, each independently of one another, a $(C_1-C_6)$alkyl, $(C_3-C_7)$cycloalkyl, phenyl or 5- or 6-membered heterocycloalkyl group, said group being optionally substituted, or else Ra and Rb are linked together to form an alkylene chain having 2 to 6 carbon atoms, optionally substituted, and Rc representing a hydrogen atom or a $(C_1-C_6)$alkyl, $(C_3-C_7)$cycloalkyl, phenyl or 5- or 6-membered heterocycloalkyl group, said group being optionally substituted, or else Rb and Rc are linked together to form an alkylene chain containing from 2 to 5 carbon atoms, optionally substituted.

Conventionally:
"$(C_1-C_6)$alkyl" is understood to mean a saturated, linear or branched, hydrocarbon group comprising from 1 to 6 carbon atoms, such as the methyl, ethyl, isopropyl, n-propyl, sec-butyl, tert-butyl, n-butyl, n-pentyl or n-hexyl groups, the term "alkylene chain comprising from 2 to 6 carbon atoms" is understood to mean a —$(CH_2)_p$— chain with p=2, 3, 4, 5 or 6, the term "$(C_3\text{-}C_7)$cycloalkyl" is understood to mean a saturated cyclic hydrocarbon group comprising from 3 to 7 carbon atoms, the term "heterocycloalkyl" is understood to mean a cycloalkyl group as defined above in which at least one of the carbon atoms has been replaced by a heteroatom of the N or S type and particularly a pyrrolidine or piperidine group.

In the case where one of the $(C_1\text{-}C_6)$alkyl, $(C_3\text{-}C_7)$cycloalkyl or phenyl groups is substituted, it may be substituted by one or more substituents chosen in particular from halogens (F, Cl, Br, I) or $(C_1\text{-}C_6)$alkyl, phenyl, hydroxyl (—OH) or $(C_1\text{-}C_6)$alkylhydroxy (—$(C_1\text{-}C_6)$alkylOH) groups. Nevertheless, preferably, these groups will be unsubstituted, their preparation being easier in this case.

Of course, in the charge transfer complex of formula (I), when Ra and Rb are linked together to form an alkylene chain, Rc will represent a hydrogen atom or a $(C_1\text{-}C_6)$alkyl, $(C_3\text{-}C_7)$ cycloalkyl, phenyl or 5- or 6-membered heterocycloalkyl group which is optionally substituted and Rc cannot be bonded to Rb.

Likewise, when Rb and Rc are linked together to form an alkylene chain, Ra will represent a $(C_1\text{-}C_6)$alkyl, $(C_3\text{-}C_7)$ cycloalkyl, phenyl or 5- or 6-membered heterocycloalkyl group which is optionally substituted and Ra cannot be bonded to Rb.

The process according to the invention has the advantage of being able to use commercially available and inexpensive rare earth metal salts. In the process according to the invention, a solution of a charge transfer complex of formula (I) formed beforehand is reacted with a salt of the rare earth metal. The anion of the charge transfer complex ($F^-$) will react, in solution, with the ions of the selected rare earth metal of the $Ln^{3+}$ type with Ln=rare earth metal. As detailed below, the reaction can be carried out in completely recyclable solvents and under mild temperature and pressure conditions. The process according to the invention uses colloidal chemistry, the rare earth fluoride formed existing in the form of nanoparticles or being formed at the surface of nanoparticles of another chemical nature and which can in particular already be present in the reaction medium. The term "nanoparticles" is understood to mean particles of nanometric size. In the context of the invention, the nanoparticles obtained can be spherical or nonspherical and can in particular exhibit an oval or slightly elongated shape, for example of the needle or rod type. We can talk more generally of "nano-objects". The largest dimension of the nanoparticles, which corresponds to their diameter in the case of spherical nanoparticles, will preferably be between 1 and 500 nm and preferably between 10 and 100 nm, this dimension being, for example, measured by dynamic light scattering, by near field microscopy or, preferably, by transmission electron microscopy. Due to their process of preparation, the size of the nanoparticles obtained will be relatively homogeneous. The nanoparticles obtained are advantageously monodisperse, that is to say they exhibit a very narrow size distribution (corresponding to the largest dimension or to the diameter in the case of spherical particles) around a mean value and in particular at least 50% of nanoparticles have their size which corresponds to the mean size±0.5 nm, determined by transmission electron microscopy, in the form of a size histogram.

In the context of the process according to the invention, the reaction between the rare earth metal salt and the charge transfer complex is preferably carried out in a solvent or a solvent mixture in which the rare earth metal salt used is soluble. The rare earth metal salt used is, for example, chosen from chlorides, nitrates and alkoxides and the solvent will be chosen as a function of the salt used. The rare earth metal, for its part, can be chosen in particular from lanthanum, cerium, praseodymium, neodymium, promethium, samarium, europium, gadolinium, terbium, dysprosium, holmium, erbium, thulium, ytterbium, lutetium, yttrium and scandium.

The solvent or one of the solvents of the mixture used for the reaction between the rare earth metal salt and the charge transfer complex can correspond to the solvent used to prepare the charge transfer complex.

The charge transfer complex is prepared prior to the reaction thereof with the rare earth metal salt. The preparation thereof is thus carried out in the absence of rare earth metal salt. For example, the charge transfer complex can be obtained by reaction of HF and dimethylformamide, resulting in the formation of a charge transfer complex in which Ra=Rb=methyl and Rc=H. The charge transfer complex can also be obtained by reaction of HF and dimethylacetamide, resulting in the formation of a charge transfer complex in which Ra=Rb=Rc=methyl. According to another alternative, the charge transfer complex can be obtained by reaction of HF and N-methylpyrrolidinone, resulting in the formation of a charge transfer complex in which Ra=methyl and -Rc-Rb-=—$(CH_2)_3$—. The preparation of the charge transfer complex can be carried out in particular at ambient temperature and at atmospheric pressure, this being done in the absence of additional solvent, with dimethylformamide, dimethylacetamide or N-methylpyrrolidinone acting both as reactant and solvent. Preferably, subsequently, the dimethylformamide, the dimethylacetamide or the N-methylpyrrolidinone also act as solvent for the reaction between the rare earth metal salt and the charge transfer complex. A portion of the solvent acts to stabilize the colloidal suspension which will be obtained by a complexing effect at the surface of the nanoparticles. Advantageously, the reaction between the rare earth metal salt and the charge transfer complex is carried out in a solvent mixture also comprising a protic solvent, such as methanol, ethanol or isopropanol.

In the case where Ra and Rb are linked, the compounds below are other examples of compounds which can be used for the formation of the charge transfer complex:

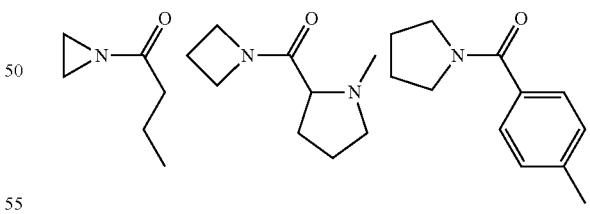

In the case where Rb and Rc are linked, the compounds below are other examples of compounds which can be used for the formation of the charge transfer complex:

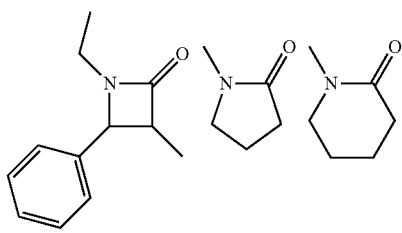

A reaction between a solution of the selected rare earth metal salt and a solution of the charge transfer complex formed beforehand can be carried out, for example, by using a solution of the rare earth metal salt in a solvent, such as the amide used for the synthesis of the charge transfer complex, a protic solvent, such as methanol, ethanol or isopropanol, or an amide/protic solvent mixture, and a solution of the charge transfer complex formed beforehand in the amide used for the synthesis thereof. As implementational example of the process according to the invention, the rare earth fluoride is formed by reaction of a solution of the rare earth metal salt in methanol with a solution of the charge transfer complex formed beforehand, at a temperature preferably of between 20 and 200° C. and preferentially between 70 and 170° C. The selected temperature, which usually requires heating, may be higher than the boiling point of the solvent (s) used. The heating will be maintained, preferably between 1 min and 48 h and preferentially between 5 min and 12 h. As demonstrated in examples 3 and 4 below, the temperature and the heating time influence the crystallinity. The higher the temperature and/or the heating time, the greater the degree of crystallinity of the obtained rare earth fluoride. It is also possible to carry out the reaction between the rare earth metal salt and the charge transfer complex under a microwave treatment, preferably with a maximum temperature of 200° C., a maximum pressure of 20 bar and a maximum power of 300 Watts.

No pressure or atmosphere condition is required to carry out the reaction between the rare earth metal salt and the charge transfer complex, no more than for the preparation of the charge transfer complex. In particular, either or both of the reactions can be carried out at atmospheric pressure and under air. Nevertheless, it may be advantageous to carry out the reaction between the rare earth metal salt and the charge transfer complex under pressure. In such a case of a solvothermal reaction, the solution is, for example, introduced into an autoclave and the temperature is increased. The pressure is generally the autogenous pressure, which can be increased by an inert gas. Preferably, the maximum temperature is 200° C. and the maximum pressure is 100 bars. In both variants of implementation, using a microwave or a solvothermal treatment, the objective is to reduce the processing time and improve the crystallinity of the rare earth fluoride formed.

Depending on the reactants and compounds present in the medium, the obtained nanoparticles can be composed exclusively, predominantly or only in part of rare earth fluoride. The term "rare earth fluoride" is understood to mean a rare earth fluoride of formula $LnF_3$ with Ln representing a rare earth metal or also a mixed fluoride or a doped fluoride. A mixed fluoride is a fluoride of a rare earth metal and of at least one other element which can be another rare earth metal or another element, for example of the alkali metal or alkaline earth metal type. Mention may be made, as examples of mixed fluoride, of $NaLnF_4$ with Ln representing a rare earth metal. A doped fluoride is a rare earth metal fluoride, a portion of the cations of which has been replaced by one or more other rare earth metals (generally from 1 to 5 atom %). To obtain a mixed rare earth fluoride or a doped fluoride, different salts will be used: salts of the rare earth metal element and of the other element or elements. The other salts will also preferably be soluble in the reaction mixture particularly in the solvent or mixture of solvents used. These salts will, for example, be chosen from chlorides, nitrates and alkoxides. It will also be possible to use a co-solvent to help solubilization of other salts used. In particular, one might add dimethylformamide, allowing for example to easier dissolve sodium salts of the nitrate type.

When no preexisting particle or nanoparticle is present in the reaction mixture, at the beginning of the synthesis, the rare earth fluoride formed is obtained in the form of nanoparticles, that is to say that the nanoparticles obtained are composed exclusively of rare earth fluoride. The rare earth fluoride can subsequently be functionalized with organic molecules, such as caprylic acid, according to methods well known to a person skilled in the art. The functionalization consists in grafting, to the surface of the nanoparticles, a molecule exhibiting a structure of the A-Sp-F type in which:

A is a functional group which provides for the attachment of the molecule to the surface Sp is a spacer group F a chemical function to change the character of the nanoparticles (dispersion properties, hydrophobicity, hydrophilicity, and the like).

Use may be made, as group A, for example, of a complexing functional group for the surface cations of the nanoparticles (phosphate, phosphonate, carboxylate, dithiophosphate, dithiophosphonate, and the like). The complexing force of this group can be reinforced by the use of multiple functional groups (polyacid, polyphosphate, and the like).

Use may be made, as spacer Sp, of any spacer known to a person skilled in the art, for example a linear or branched alkyl chain or an aromatic group or a combination of these groups, which can be interrupted by one or more heteroatoms chosen from O, N, S or P.

Use may be made, as chemical functional group F, of any chemical functional group known to a person skilled in the art. Examples of such functional groups and guides are given in the international patent application WO 2008/139100, "Method for preparing a colloidal zirconia solution".

For example, the surface of the rare earth metal fluoride obtained can be functionalized with an organic molecule carrying a bisphosphonate functional group.

In carrying out the reaction between the rare earth metal salt and the charge transfer complex in the presence of preexisting particles or nanoparticles, the formation of the rare earth metal fluoride will take place in the form of a layer which will cover the surface of the existing particles or nanoparticles present in the reaction medium. It is then possible to obtain a great diversity of nanoparticles. The core, corresponding to the existing particles present in the reaction medium at the beginning of the synthesis, can, for example, be composed of an oxide (silica, alumina, zirconium, and the like), a metal (gold, platinum, palladium, and the like), a chalcogenide, and the like. These assemblies may retain the initial properties of the fluoride or may have novel properties. The coating can subsequently also be functionalized, as described in detail above.

It thus appears that the process according to the invention exhibits numerous advantages: it can be carried out at low temperature, without special conditions of atmosphere, for example in air. It offers a great mastery, in terms of composition, purity or crystallinity of the compounds obtained. It is compatible with a chemical modification of the surface state of the nanoparticles or of the coating obtained. The process is compatible with the use of nontoxic and recyclable solvents. For all these reasons, plus ease and speed of implementation, the process according to the invention can be easily transferred to the industrial scale.

According to another of its aspects, the invention relates to a xerogel obtained by assembling nanoparticles composed, at least in part, of a rare earth fluoride. In particular, the nanoparticles obtained by virtue of the process according to the invention can be assembled to form a xerogel. Such a xerogel can be obtained by destabilization of a colloidal suspension of nanoparticles composed, at least in part, of a rare earth fluoride, in particular with acetone, and drying the resultant precipitate. Preferably, the colloidal suspension is obtained with the process according to the invention. In the case of nanoparticles composed exclusively of rare earth fluoride, the xerogel obtained can exist in the form of a transparent material that will provide an alternative to single crystals of rare earth fluoride in question, which are generally difficult to produce.

The examples below, with reference to the appended figures, make it possible to illustrate the invention but do not have any limiting nature.

FIG. 1 presents the X-ray diffraction patterns (CuKα) of ytterbium fluoride nanoparticles synthesized in different reactive solvents.

FIG. 2 presents the X-ray diffraction patterns (CuKα) of ytterbium fluoride and lutetium fluoride nanoparticles synthesized in NMP at high temperature.

Figure 9:
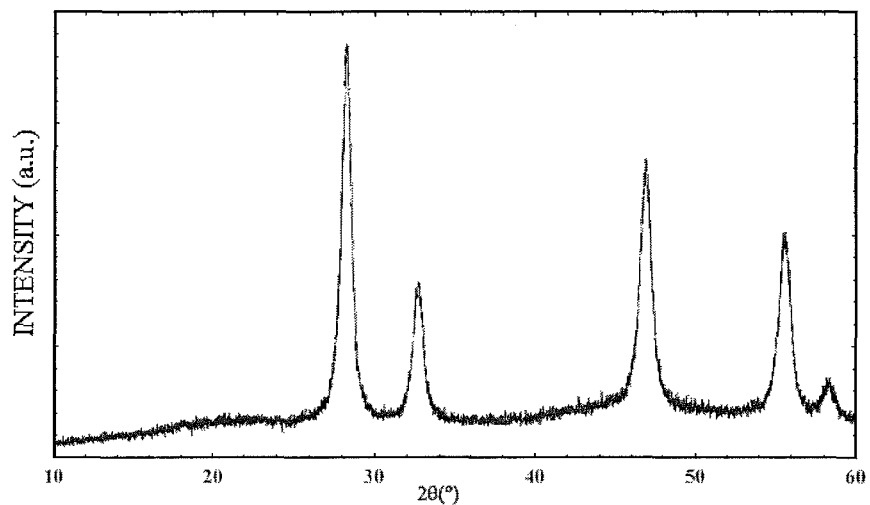

FIG. 9 presents the X-ray diffraction pattern (CuKα) of mixed sodium ytterbium fluoride nanoparticles synthesized in DMF at 70° C.

Figure 10:
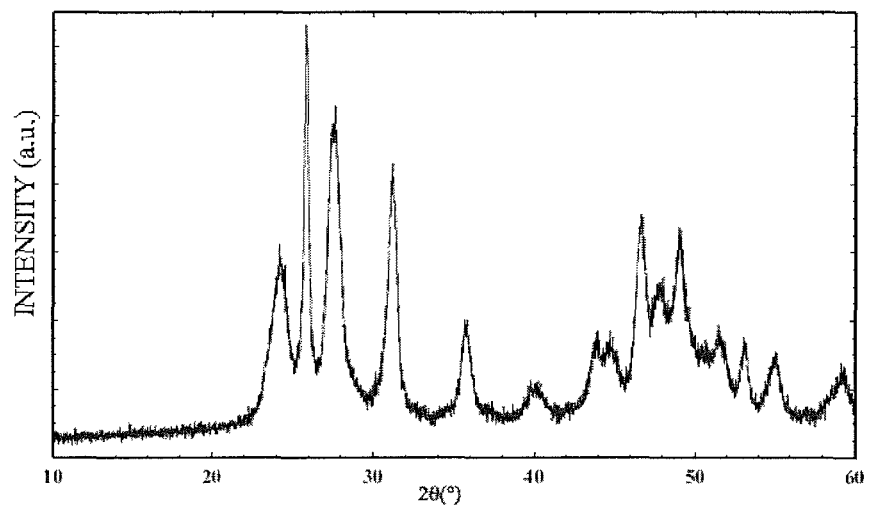

FIG. 10 presents the X-ray diffraction pattern (CuKα) of $Yb_{0.8}La_{0.15}Tb_{0.05}F_3$ mixed fluoride nanoparticles synthesized in NMP at high temperature.

Figure 11:
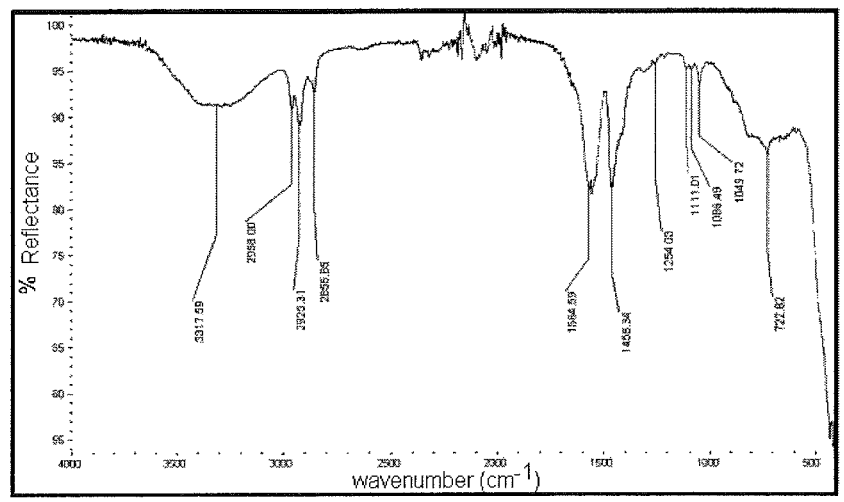

FIG. 11 presents the infrared spectrum of $YbF_3$ nanoparticles, the surface of which is modified with caprylic acid.

Figure 12:
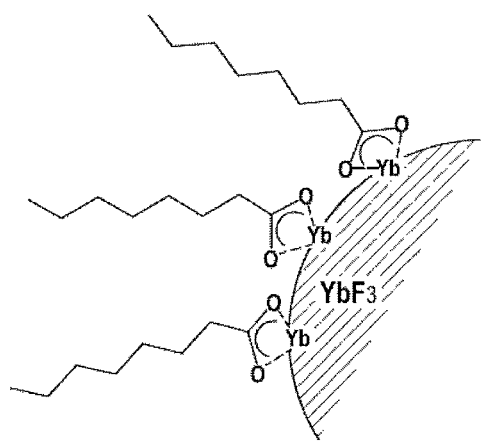

FIG. 12 is a schematic representation of $YbF_3$ nanoparticles obtained according to the process of the invention and modified with caprylic acid.

EXAMPLE 1

Synthesis of Ytterbium Fluoride Nanoparticles Using the Different "Reactive" Solvents as Follows

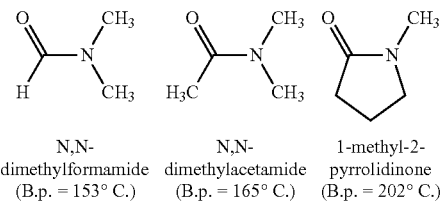

N,N-dimethylformamide (B.p. = 153° C.)  N,N-dimethylacetamide (B.p. = 165° C.)  1-methyl-2-pyrrolidinone (B.p. = 202° C.)

The fluorine source is hydrofluoric acid: HF (40%, d=1.13, MW=20.01).

During bubbling of gaseous HF through a N,N-dimethylformamide solution, three major changes occur in the infrared spectrum which show the formation of amidium cations:

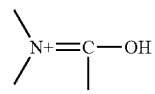

In the region centered around 3000 cm$^{-1}$, there appears a broad band assigned to the stretching vibration of the —OH groups.

In the region centered around 1650 cm$^{-1}$, there appears a narrow band assigned to the stretching vibrations of the C=N$^+$ groups (protonated DMF). At the same time, the vibration band of the C=O group of the amide gradually disappears.

In the region centered around 670 cm$^{-1}$, there appears a band at 679 cm$^{-1}$ indicative of the formation of an intermediate complex which leads to protonated DMF. At the same time, the band at 660 cm$^{-1}$ assigned to the vibrations of the O=C—N groups of the unprotonated DMF disappears.

The formation of the charge transfer complex is also demonstrated in the same way, in the case of N,N-dimethylacetamide and 1-methyl-2-pyrrolidinone. These data are in agreement with the literature (Protonation du N,N-diméthylformamide: étude par spectrométries vibrationnelle et électronique [Protonation of N,N-dimethylformamide: vibrational and electronic spectrometric study], P. Combelas, M. Costes and C. Garrigou-Lagrange, Can. J. Chem., 53, 442 (1975)), which had already demonstrated the formation of such complexes.

The ytterbium source is $YbCl_3 \cdot 6H_2O$ (MW=387.49).

0.45 g of hydrofluoric acid (i.e. 0.009 mol of HF, 0.4 ml) is collected in a Teflon container and mixed with 16 ml of solvent. The mixture, which warms up very slightly, is poured into a round-bottomed flask.

Subsequently, a solution containing a lanthanide salt: 1.55 g of $YbCl_3 \cdot 6H_2O$ (4×10$^{-3}$ mol)+3 ml of MeOH, is slowly poured in with stirring.

Figure 1:
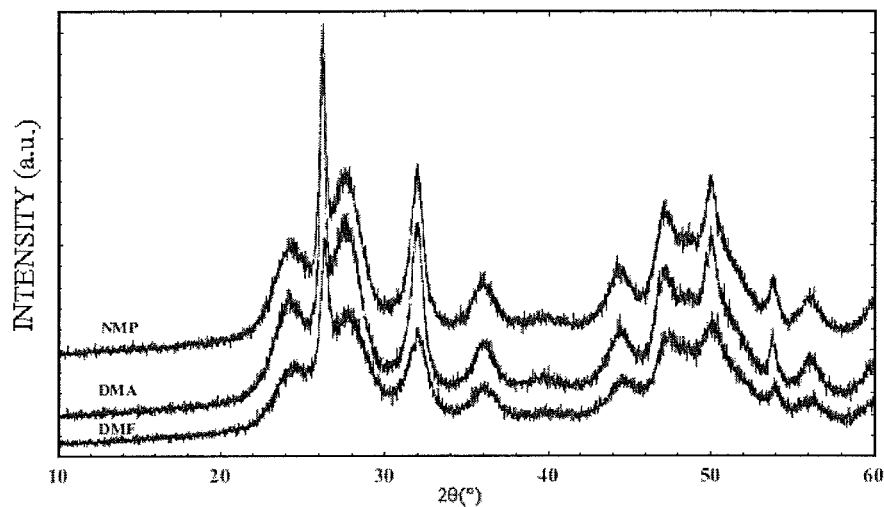

At the end of the addition, the solution is transparent; the temperature is then raised gradually to 70° C. After a heating period of the order of 15 hours, the solutions became opalescent and correspond to colloidal solutions. The introduction of a portion of these solutions into acetone results in the precipitation of the nanoparticles. After isolation by centrifuging and drying the precipitates, the nanoparticle powders are analyzed by X-ray diffraction. The X-ray diffraction patterns (CuKα) of the ytterbium fluoride nanoparticles synthesized in the various reactive solvents are presented in FIG. 1. They were indexed using the JCPDS file 32-1418 (orthorhombic $YbF_3$). The broadening of the diffraction lines originates from the finite extension of the coherent diffraction domains and from the existence of microdeformations of the lattice relating to the presence of defects.

EXAMPLE 2

Synthesis of Ytterbium Fluoride and Lutetium Fluoride Nanoparticles Using 1-Methyl-2-Pyrrolidinone as Solvent at High Temperature (T>70° C.)

Figure 2:
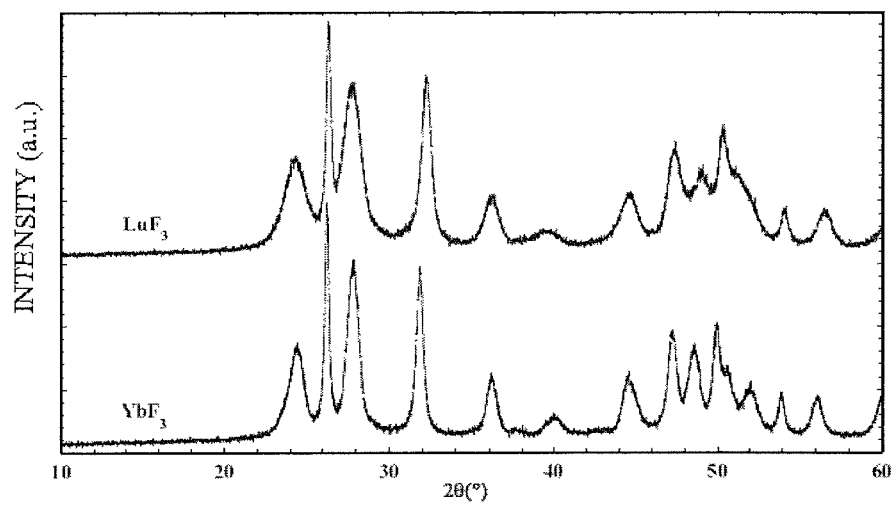

The procedure is as in example 1, using 1-methyl-2-pyrrolidinone (NMP) as solvent. After preparing the final mixture by addition of the ytterbium chloride or lutetium chloride solution, the temperature is gradually raised until the solvent is refluxed. The temperature of the mixture is then stabilized at 107° C. After heating for 5 minutes, the solution becomes opalescent; heating is maintained for 16 hours. The diffraction patterns of the obtained nanoparticle powders are presented in FIG. 2. They were indexed using the JCPDS file 32-1418 ($YbF_3$ of orthorhombic structure) and the JCPDS file 32-0612 ($LuF_3$ of orthorhombic structure).

Figure 3:
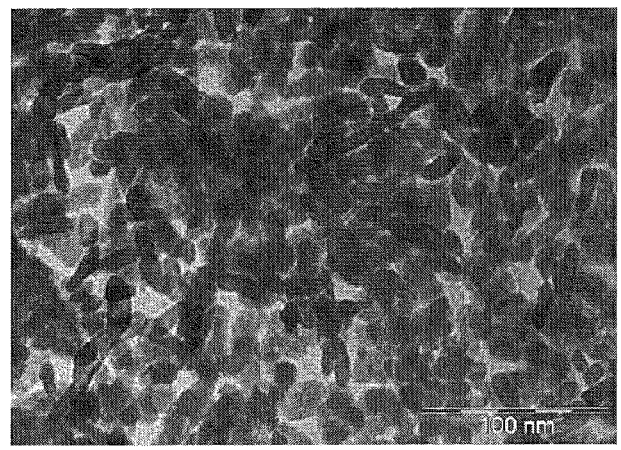
FIG. 3 is a transmission electron microscopy photograph which shows ytterbium fluoride nanoparticles obtained in NMP at high temperature.

The transmission electron microscopy observations (photograph presented in FIG. 3) show a particle size of between 10 and 20 nm for $YbF_3$.

EXAMPLE 3

Figure 4:
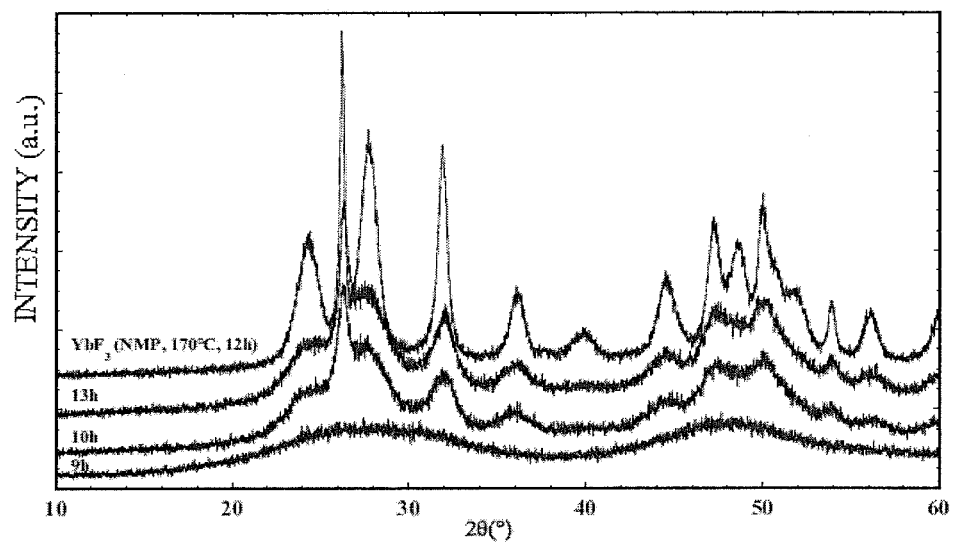
FIG. 4 shows the X-ray diffraction patterns (CuKα) of ytterbium fluoride nanoparticles synthesized in DMF at 70° C. for different heat treatment times.

Synthesis of Ytterbium Fluoride Nanoparticles Using N,N-Dimethylformamide at 70° C. with Different Heating Times The procedure is as in example 1, using N,N-dimethylformamide (DMF) as solvent. After preparing the final mixture, the temperature is gradually raised up to 70° C. While keeping the temperature constant, samples are regularly withdrawn and analyzed by X-ray diffraction and by light scattering. The change in the size of the particles as a function of treatment time is given in table 1. FIG. 4 shows the change of X-rays diffraction patterns for different processing time. For comparison, the diffraction pattern of $YbF_3$ nanoparticles synthesized in NMP at high temperature has been given in the same figure. Below 10 h of treatment at 70° C., the nanoparticles are not crystalline.

TABLE 1

Change with treatment time at 70° C. in the hydrodynamic diameter and in the crystallinity state for ytterbium fluoride nanoparticles

| Treatment time (h) | Hydrodynamic diameter (nm) | Crystallinity state |
| --- | --- | --- |
| 7 | 4 | Amorphous |
| 8.5 | 38 | Amorphous |
| 9 | 50 | Amorphous |
| 10 | 90 | Crystalline |
| 13 | 122 | Crystalline |

Figure 5:
FIG. 5 is a transmission electron microscopy photograph which shows ytterbium fluoride nanoparticles obtained in DMF at 70° C. (10 h).

A transmission electron microscopy photograph, which shows the morphology of the particles after 10 h of treatment of the reaction medium, is shown in FIG. 5. The particles consist of primary nanometric needles which aggregate into bundles.

EXAMPLE 4

Figure 6:
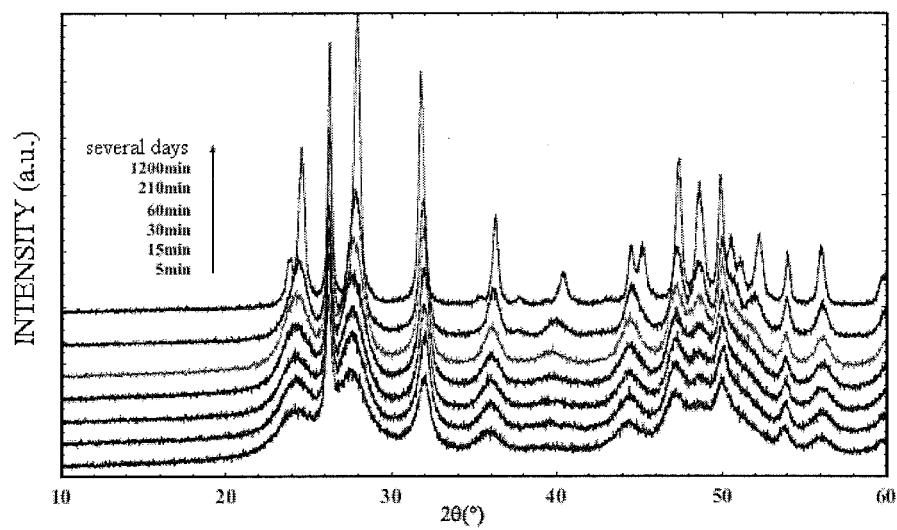
FIG. 6 shows the X-ray diffraction patterns (CuKα) of ytterbium fluoride nanoparticles synthesized in NMP at high temperature for different heat treatment times.

Synthesis of Ytterbium Fluoride Nanoparticles Using 1-Methyl-2-Pyrrolidinone as Solvent at 170° C. with Different Heating Times The procedure is as in example 2, using 1-methyl-2-pyrrolidinone (NMP) as solvent. After preparing the final mixture, the temperature of the bath is gradually raised up to 170° C. (the temperature of the reaction mixture is set by the boiling point of the solvent mixture). While keeping the temperature constant, samples are regularly withdrawn and analyzed by X-ray diffraction. FIG. 6 shows the change of X-rays diffraction patterns for different processing time.

EXAMPLE 5

Synthesis of Rare Earth Fluoride Nanoparticles (the Rare Earth Metals being Y, La, Ce, Pr, Nd, Sm, Eu, Gd, Tb, Dy, Ho, Er, Tm, Yb and Lu) in N,N-Dimethylformamide at 70° C.

Figure 7:
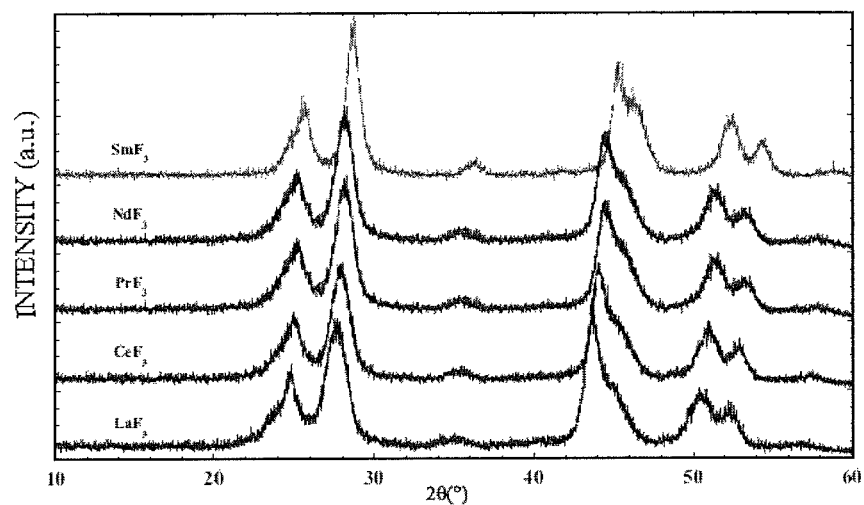
FIG. 7 shows the X-ray diffraction patterns (CuKα) of rare earth metal fluoride nanoparticles (hexagonal structure) synthesized in DMF at 70° C.
Figure 8:
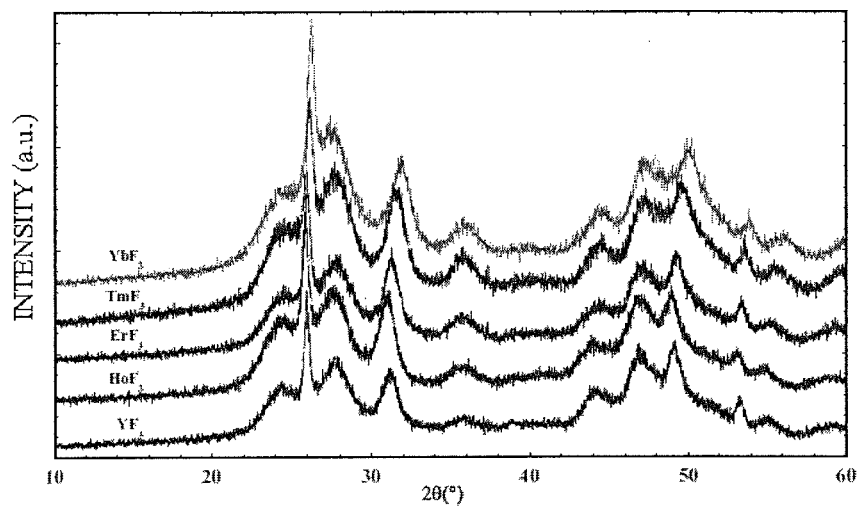
FIG. 8 shows the X-ray diffraction patterns (CuKα) of rare earth metal fluoride nanoparticles (orthorhombic structure) synthesized in DMF at 70° C.

The procedure is as in example 1, using N,N-dimethylformamide (DMF) as main solvent. After preparing the final mixture by addition of the methanolic solution of the hydrated chloride of the chosen rare earth metal, the temperature is gradually raised up to 70° C. The temperature is kept constant for several hours until the solution becomes opalescent. The nanoparticle powders isolated after purification are analyzed by X-ray diffraction. The X-ray diffraction patterns for different rare earth fluorides are shown in FIGS. 7 and 8.

EXAMPLE 6

Synthesis of Mixed Fluoride ($NaYbF_4$, $Yb_{0.8}La_{0.15}Tb_{0.05}F_3$) Nanoparticles a) Synthesis of Sodium Ytterbium Fluoride Nanoparticles, Using DMF as Solvent The fluorine source is hydrofluoric acid: HF (40%, d=1.13, MW=20.01).

The ytterbium source is $Yb(NO_3)_3 \cdot 5H_2O$ (MW=449.13).

The sodium source is $NaNO_3$ (MW=84.99).

The composition of the hydrofluoric acid solution is given below:

0.62 g of 40% HF 22 ml of anhydrous DMF

The mixture warms up very slightly.

The complete mixture is placed in a round-bottomed flask to which the following solution is added with vigorous stirring:

1.852 g of Yb(NO$_3$)$_3$.5H$_2$O 0.35 g of NaNO$_3$ 6 ml of MeOH+4 ml of DMF

At the end of the addition, the solution is transparent and the temperature raised up to 70° C. After stirring for 45 minutes, a colloidal solution is obtained. Heating is maintained for several tens of hours. The purified nanoparticle powder is analyzed by X-ray diffraction. The diffraction pattern, presented in FIG. 9, shows that the NaYF$_4$ cubic phase is synthesized (JCPDS file 77-2043).

b) For Yb$_{0.8}$La$_{0.15}$Tb$_{0.05}$F$_3$, the procedure is as in example 2, using NMP as main solvent. After preparing the final mixture by addition of the methanolic solution of rare earth metal salts in the chosen proportions, the temperature of the heating bath is gradually raised up to 170° C. The temperature is kept constant for 16 hours and the solution becomes opalescent. The purified nanoparticle powder is analyzed by X-ray diffraction. The diffraction pattern, presented in FIG. 10, shows that the Yb$_{0.8}$La$_{0.15}$Tb$_{0.05}$F$_3$ orthorhombic phase is obtained.

EXAMPLE 7

Modification by Caprylic Acid of the Surface of Ytterbium Fluoride Nanoparticles Prepared in NMP at High Temperature YbF$_3$ nanoparticles are synthesized by a process similar to that described in example 2. The nanoparticles are purified by successive precipitation and centrifuging operations. They are dispersed in a large excess of caprylic acid using a sonicator. The resulting suspension is heated to 150° C. for twelve hours. Centrifuging the mixture obtained after cooling gives a precipitate which disperses poorly in chloroform. The suspension is destabilized by adding in ethanol. This cycle is repeated several times until a transparent colloidal solution in chloroform is obtained. The size of the particles, measured by light scattering, is centered around 50 nm. FIG. 11 shows the infrared spectrum of the nanoparticle powder thus prepared. The two bands at 1458 and 1565 cm$^{-1}$ are assigned to the symmetrical and antisymmetrical stretching vibrations of the carboxylate groups present and represented in FIG. 12. This is evidence of the presence of organic molecules on the surface of the particles. Functionalization with oleic acid has also been carried out.

EXAMPLE 8

Functionalization with a Trialkoxysilane of the Surface of Ytterbium Fluoride Nanoparticles Prepared in NMP at High Temperature YbF$_3$ nanoparticles are synthesized by a process similar to that described in example 2. The nanoparticles are purified by successive precipitation and centrifuging operations. They are easily dispersed with a sonicator in a volume of deionized water, so that a concentration of nanoparticles of 10 g/l is obtained. The colloid prepared is then introduced with vigorous stirring into the same volume of a dilute solution of tetramethylammonium silicate (3% by weight of silica). The mixture which results therefrom is clear (slightly opalescent) and its pH is approximately 11. After reacting at ambient temperature for 24 h, the solution is purified by dialysis in order to remove certain undesirable species present (various ions, excess silicates, and the like). Finally the resulting solution has a pH of about 7. It is brought back to 9 by addition of tetrabutylammonium hydroxide in order to provide for better stability of the silicate-coated nanoparticles (increase in the zeta potential in absolute value) and to prepare the next step. In the latter, the aqueous solution of silicate-coated nanoparticles is introduced dropwise into an ethanolic solution of alkoxysilane (the alkoxysilane/YbF$_3$ molar ratio is of the order of 5) brought to reflux. After reacting for several hours, the coated nanoparticles are purified and dispersed in a solvent which depends on the alkoxysilane grafted. In this example, the nanoparticles are easily dispersed in ethanol after functionalization with methacryloyloxypropyltrimethoxysilane.

EXAMPLE 9

Preparation of a Xerogel Based on Ytterbium Fluoride Nanoparticles Synthesized in DMF YbF$_3$ nanoparticles are synthesized by a process comparable to that described in example 1. The colloidal solution obtained is destabilized in the presence of acetone. Centrifuging the resulting suspension at 6000 rpm for 10 min results in a perfectly transparent nanoparticle gel. Drying the gel at 50° C. for 1 h gives an ytterbium fluoride xerogel. This approach makes possible the preparation of transparent inorganic materials.

EXAMPLE 10

Synthesis of Ytterbium Fluoride Nanoparticles Using 1-Methyl-2-Pyrrolidinone as Solvent and Microwave Heating of the Reaction Medium The procedure is as in example 2, using 1-methyl-2-pyrrolidinone (NMP) as solvent. The final mixture is introduced into a closed reactor and the set is placed in a CEM microwave oven (Discover). The set temperature and the hold time at this temperature are respectively set at 110° C. and 5 minutes. During the treatment, the pressure inside the reactor rises slightly. After this treatment, a colloidal solution is obtained. The nanoparticles are purified by successive precipitation and centrifuging operations. The diffraction pattern of the obtained nanoparticle powder was indexed using the JCPDS file 32-1418 (YbF$_3$ of orthorhombic structure). The pattern is similar to that shown in FIG. 2. This example clearly shows the advantages of a microwave treatment in the synthesis of lanthanide fluorides.

EXAMPLE 11

Surface Modification by 1-Hydroxy-3,6,9,12,15,18,21-Heptaoxadocosylidene-1,1-Bisphosphonic Acid (Pb1) of Ytterbium Fluoride Nanoparticles Prepared in Nmp at High Temperature

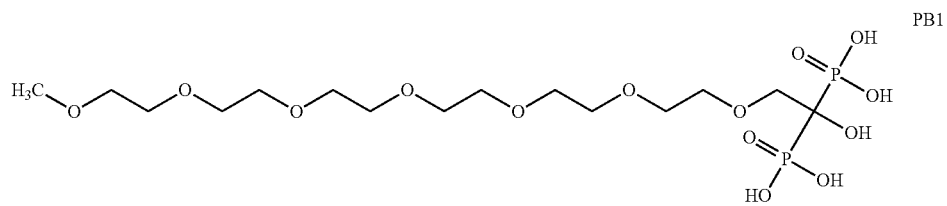 [SMILES: COCCOCCOCCOCCOCCOCCOCC(O)(P(=O)(O)O)P(=O)(O)O]

PB1

YbF$_3$ nanoparticles as obtained in example 2 are dispersed in deionized water using a sonicator. The concentration of ytterbium in the colloidal solution is 0.33 mol/L. To this solution, PEGylated bisphosphonate (PB1), previously dissolved in an equivalent volume of deionized water, is added (the Yb/PB1 molar ratio=2). The clear mixture obtained is brought to 70° C. for one hour. The excess bisphosphonate is removed by dialysis (against deionized water) or by tangential flow filtration (deionized water). The PEGylated nanoparticles are isolated by lyophilization. In addition to the bands characteristic of the PEG chain, the infrared spectrum of the PEGylated YbF$_3$ nanoparticle powder shows that the characteristic bands of the P—OH groups of PB1 have disappeared in favor of a strong band (in the vicinity of 1100 cm$^{-1}$) characterizing the formation of Yb—O—P bonds. The lyophilisate can be easily dispersed in deionized water with the assistance of ultrasound.

EXAMPLE 12

Surface Modification by 1-Hydroxy-3,7,11,15-Tetramethylhexadecylidene-1,1-Bisphosphonic Acid of Ytterbium Fluoride Nanoparticles Prepared in NMP at High Temperature

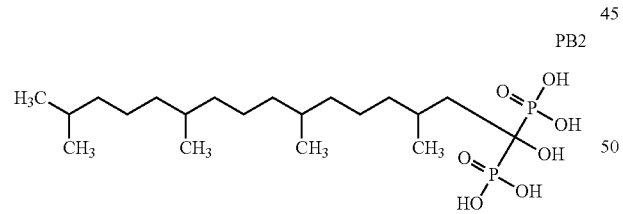

PB2

YbF$_3$ nanoparticles as obtained in example 2 are dispersed in deionized water using a sonicator. The concentration of ytterbium in the colloidal solution is 0.33 mol/L. To this solution, Bisphosphonate containing a fatty chain (PB2), previously dissolved in an equivalent volume of toluene, is added with vigorous stirring to the solution (the Yb/PB2 molar ratio=2). An emulsion is rapidly formed. After stirring for one hour, the emulsion is broken by addition of methanol and the nanoparticles which precipitate are isolated and purified by centrifuging (excess bisphosphonate is also removed). In addition to the bands characteristic of the organic chain, the infrared spectrum of the dried functionalized YbF$_3$ nanoparticle powder shows that the characteristic bands of the P—OH groups of PB2 have disappeared in favor of a strong band (in the vicinity of 1100 cm$^{-1}$) characterizing the formation of Yb—O—P bonds. The nanoparticle powder can be very easily dispersed in hexane.

EXAMPLE 13

Surface Modification by 1-Hydroxy-3,6,9,12,15,18,21-Heptaoxadocosylidene-1,1-Bisphosphonic Acid of Gadolinium Fluoride Nanoparticles Prepared in NMP at High Temperature

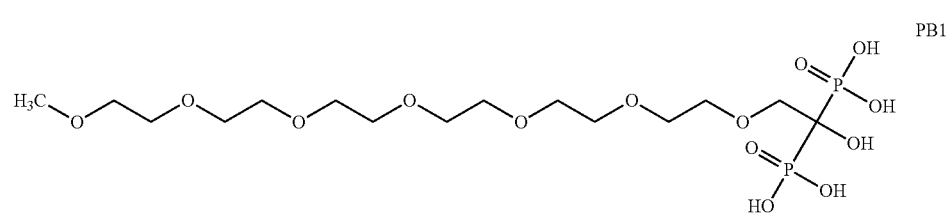 [SMILES: COCCOCCOCCOCCOCCOCCOCC(O)(P(=O)(O)O)P(=O)(O)O]

PB1

The synthesis of PEGylated GdF₃ nanoparticles is carried out according to a process similar to that described in example 11. The PEGylated nanoparticles, isolated by lyophilization, are dispersed in physiological serum (0.9% NaCl) with the assistance of ultrasound. The concentration of gadolinium, measured by ICP (Inductively Coupled Plasma), is 0.1 mol/L. The Gd/P molar ratio was also evaluated by ICP. It is equal to 12, i.e. 24 Gd per PEG chain. The size of the bare particles (without PEG chain), measured by DLS, is between 10 and 20 nm; this hydrodynamic diameter changes to approximately 75 nm when the particles are covered with the PEG chains. Transmission electron microscopy observations have shown that the nanocrystals are spherical in shape. The stability of the colloidal solutions in water and in saline solution was studied by measurements of zeta potential and the size as a function of pH. This stability is checked for a broad range of pH extending from 5 to 14 and thus covering the value of the pH of the blood in vivo. These PEGylated nanoparticles can act as contrast agent in MRI.

With the aim of optimizing the magnetic response of the previous system, GdF₃ nanoparticles functionalized with Gd-DOTA were prepared using the same approach:

EXAMPLE 14

Surface Modification by a Bisphosphonate Comprising a Polymerizable Functional Group, of Ytterbium Fluoride Nanoparticles Prepared in NMP at High Temperature YbF₃ nanoparticles modified with PB3 molecules comprising a polymerizable functional group are synthesized by a process similar to that described in example 11. The nanoparticles thus synthesized can be incorporated into a polymer prepared from polymerizable monomers having functions similar to those of BP3.

The invention claimed is:

1. A process for the preparation of nanoparticles composed, at least in part, of a rare earth fluoride, characterized in that said fluoride is obtained by reaction in solution of a salt of the corresponding rare earth metal and of a charge transfer complex of formula (I):

$$\left[ \begin{array}{c} Ra \\ \diagdown \\ N=C \\ \diagup \\ Rb \end{array} \begin{array}{c} O-H \\ \diagup \\ \diagdown \\ Rc \end{array} \right]^{+} F^{-}$$ (I)

in which:

Ra and Rb, which are identical or different, represent, each independently of one another, a $(C_1-C_6)$alkyl, $(C_3-C_7)$ cycloalkyl, phenyl or 5- or 6-membered heterocycloalkyl group, said group being optionally substituted, or else Ra and Rb are linked together to form an optionally substituted alkylene chain comprising from 2 to 6 carbon atoms, and Rc represents a hydrogen atom or a $(C_1-C_6)$alkyl, $(C_3-C_7)$ cycloalkyl, phenyl or 5- or 6-membered heterocycloalkyl group, said group being optionally substituted, or else Rb and Rc are linked together to form an optionally substituted alkylene chain comprising from 2 to 5 carbon atoms.

2. The process as claimed in claim 1, characterized in that the reaction between the rare earth metal salt and the charge transfer complex is carried out in a solvent or a solvent mixture in which the rare earth metal salt used is soluble.

3. The process as claimed in claim 1, characterized in that the charge transfer complex is obtained beforehand by reaction of HF and dimethylformamide, resulting in the formation of a charge transfer complex in which Ra=Rb=methyl and Rc=H.

4. The process as claimed in claim 1, characterized in that the charge transfer complex is obtained beforehand by reaction of HF and dimethylacetamide, resulting in the formation of a charge transfer complex in which Ra=Rb=Rc=methyl.

5. The process as claimed in claim 1, characterized in that the charge transfer complex is obtained beforehand by reaction of HF and N-methylpyrrolidinone, resulting in the formation of a charge transfer complex in which Ra=methyl and -Rc-Rb-=—(CH$_2$)$_3$—.

6. The process as claimed in claim 1, characterized in that the reaction between the rare earth metal salt and the charge transfer complex is carried out in a solvent mixture comprising a protic solvent.

7. The process as claimed in claim 6, characterized in that the protic solvent is methanol, ethanol or isopropanol.

8. The process as claimed in claim 1, characterized in that the charge transfer complex is formed beforehand from a solution of HF and of dimethylformamide, dimethylacetamide or N-methylpyrrolidinone and in that the dimethylformamide, the dimethylacetamide or the N-methylpyrrolidinone also acts as solvent for the subsequent reaction between the rare earth metal salt and the charge transfer complex.

9. The process as claimed in claim 1, characterized in that the rare earth fluoride is formed by reaction of a solution of the rare earth metal salt in methanol with a solution of the charge transfer complex at a temperature between 20 and 200° C.

10. The process as claimed in claim 1, characterized in that the rare earth metal salt is chosen from chlorides, nitrates and alkoxides.

11. The process as claimed in claim 1, characterized in that the obtained rare earth fluoride is subsequently functionalized with organic molecules leading to functionalized nanoparticles.

12. The process as claimed in claim 1, characterized in that said rare earth fluoride is formed in the presence of existing nanoparticles and, is obtained in the form of a layer which will cover a surface of existing nanoparticles.

13. The process as claimed in claim 1, characterized in that the rare earth fluoride is formed from a salt of the corresponding rare earth metal and from a salt of another element and is obtained in the form of a mixed or doped fluoride.

14. The process as claimed in claim 1, characterized in that the rare earth metal is chosen from lanthanum, cerium, praseodymium, neodymium, promethium, samarium, europium, gadolinium, terbium, dysprosium, holmium, erbium, thulium, ytterbium, lutetium, yttrium and scandium.

15. The process as claimed in claim 1, characterized in that the surface of the rare earth fluoride obtained is functionalized with an organic molecule carrying a bisphosphonate functional group.

* * * * *